March 4, 1952  R. M. DOWNEY  2,587,710
APPARATUS AND PROCESS FOR MAKING MINERAL WOOL
Filed Nov. 1, 1951
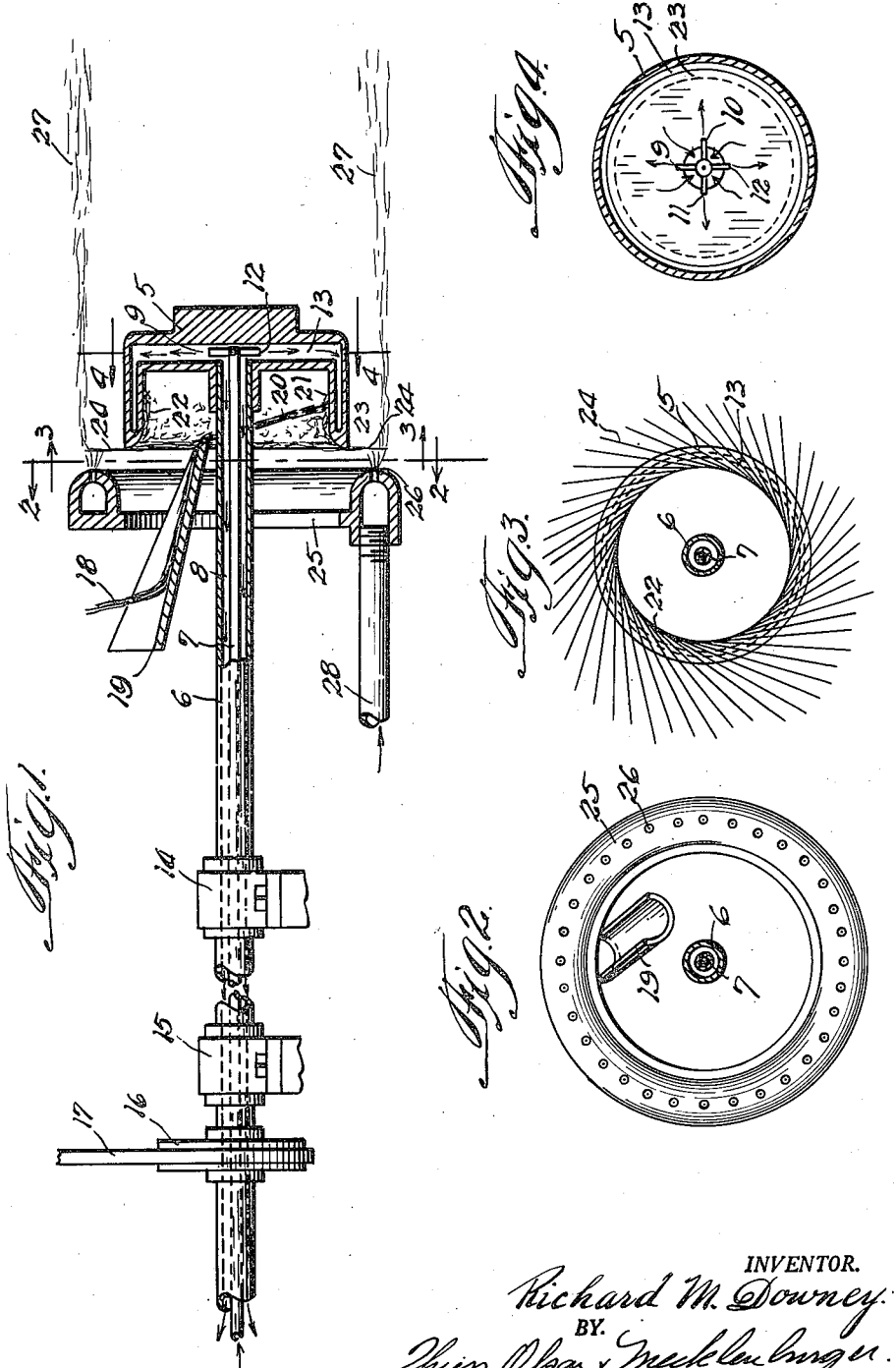
INVENTOR.
Richard M. Downey
BY Patented Mar. 4, 1952

2,587,710

UNITED STATES PATENT OFFICE 2,587,710

APPARATUS AND PROCESS FOR MAKING MINERAL WOOL

Richard M. Downey, North Judson, Ind., assignor to United States Gypsum Company, Chicago, Ill., a corporation of Illinois Application November 1, 1951, Serial No. 254,373

5 Claims. (Cl. 18—2.4)

The present invention relates to an improved apparatus and process for making mineral wool and the like.

The present process is of the type in which a stream of molten mineral matter is distributed in the form of streams flung tangentially from a rotating rotor, these streams then being intercepted by an annular blast of gaseous liquid where the melt has sufficient momentum imparted to it to become attenuated into fibers.

In processes of this type the control of the temperature and of the viscosity of the molten material is of considerable importance, because the fineness of the fibers and their length is dependent thereon.

Accordingly it is one of the objects of the present invention to provide an apparatus in which the control of these quantities is facile and certain.

It is a further object of the invention to provide an improved method for making mineral wool.

The apparatus employed for carrying out the present invention is in many respects very similar to that disclosed in my copending application Serial No. 194,180, filed November 4, 1950, in that I use the same type of rotor and steam nozzle, with the exception that I now provide means for controlling the temperature of the rotor and therefore also of the molten material which is brought into contact therewith.

In the drawings:

Fig. 1 is a side elevational view, partly in section, of the apparatus;

Fig. 2 is a vertical section along the line 2—2 of Fig. 1;

Fig. 3 is a vertical section through the apparatus along the line 3—3 of Fig. 1; and Fig. 4 is a vertical section through the rotor along the line 4—4 of Fig. 1.

The apparatus consists primarily of a rotor 5 which is mounted upon a hollow shaft 6, said shaft housing a central pipe 7 which is stationary relative to the shaft. This pipe communicates through the branches 9, 10, 11 and 12, with the hollow space 13, which is provided in the walls of the rotor for the purpose of permitting the passage of a suitable coolant such as a liquid or gas therethrough, it being understood that the coolant will pass into and out of the hollow space, and leave through the annular space 8 remaining in the shaft 6. The coolant may be water, steam, a suitable heat-resistant oil, or a compound such as diphenyl. The means for effecting the introduction of the coolant into the pipe or shaft are well known and hence require no description. The shaft is mounted upon suitable bearings 14 and 15, and a pulley 16 and belt 17 serve as a means for rotating the shaft and hence also the rotor.

Molten material 18, which may for example be melted slag, is allowed to flow through the chute 19, to form a freely falling stream 20 which is allowed to fall upon the interior wall 21 of the rotor where it will form a rapidly rotating annulus or ring 22. This ring works its way over the edges or rim 23 of the rotor, as a result of which there will be tangentially discharged a great multitude of streams 24 of the molten material. A blow nozzle 25, provided with openings 26 arranged in the form of a circle somewhat larger in diameter than that of the rotor 5, is arranged so as to blow a gaseous fluid, such as steam, against the streams 24 whereby their direction is suddenly and violently changed, with the result that the little streams of material will become attenuated into fibers 27, which may be received in a collecting chamber (not shown). The steam for this purpose may be provided through the pipe 28. It is to be understood that air or other gas may be used instead of steam.

Example

It has been found that the melted slag usually has a temperature which is somewhat too high for effective conversion into fibers of the desired length and thickness. Thus a typical slag used for the present purposes may have a composition as follows:

| | Per cent |
|---|---|
| $SiO_2$ | 42.2 |
| $Al_2O_3$ | 13.5 |
| CaO | 38.5 |
| MgO | 7.6 |
| $M_2O$ | .9 | in which M represents an alkali such as sodium.

As the slag comes from the cupola it may have a temperature as high as say about 2800° F. and a viscosity of about 3.7 poises. There will be a slight cooling of the slag as a result of its running through the trough 19, but it was found that it would normally have a temperature of about 2600° F. and a viscosity of about 7.4 poises where it leaves the end of the trough and falls onto the side 21 of the rotor.

Sufficient water or other cooling medium is passed through the interior hollow walls of the rotor, namely the space 13, to reduce the temperature of the slag in the annulus to about 2500° F. at which time it will have a viscosity of about 10 to 14 poises It is preferred to have the slag tangentially discharged from the rim of the rotor at about the optimum viscosity. Employing slag of the above given composition and using a steel rotor having a total weight of about 130 pounds, and having a specific heat of about 0.12, and with a rate of production of 4000 pounds per hour, this requires about 45 pounds of water per minute with an intake temperature of about 115° F. and an outlet temperature of about 150° F. This amounts to a heat-abstraction of about 900 B. t. u. per minute, and a temperature drop of the slag of about 300° F. The amounts of water required for other types of slag, differently sized rotor and different rates of production may be calculated from these data.

The temperatures of the slag as it leaves the chute 19, and the temperature which it has in the annulus, may be ascertained by means of any well known type of optical pyrometer. However, an alternative method of control is to measure the temperature of the inlet water, the temperature of the outlet water, and the rate of flow of water through the apparatus. The viscosity of the slag at the time at which it is blown into fibers may vary within the range of from about 8 to about 25 poises. The basis for these figures are from publications appearing in Technical Paper #187 of the United States Bureau of Mines, by Feild and Royster.

When operating in accordance with the present invention it has been found possible to make mineral wool of a much greater degree of uniformity relative to its length and fiber fineness than without the control of the temperature and viscosity of the molten slag.

There is a decided advantage in operating in the manner shown as by varying the speed of rotation of the rotor and also of the force of the blast of gaseous fluid; and also by controlling the temperatures as above indicated, the entire operation becomes quantitatively controllable, which has not hitherto been possible in this art Applicant claims:

1. Process of making fibers from molten mineral material which comprises pouring a hot stream of said material onto the interior surface of a cup-shaped hollow-walled distributing rotor rotating on a substantially horizontal axis to form a hot molten annulus rotating about a substantially horizontal axis, lowering the temperature of said annulus by passing a predetermined amount of a coolant through the hollow walls of said rotor, flinging streams of the thus temperature-controlled molten material tangentially outwardly from the rim of said rotor, and intercepting said streams by a high velocity annular blast of a gaseous fluid to attenuate the streams into fibers.

2. Process of making mineral wool which comprises pouring a hot stream of molten slag-like material onto the interior wall of a substantially horizontally disposed hollow-walled rotor having one end open to form a cup-shaped distributor rotating about a substantially horizontal axis to form a confined annulus of said molten material within said distributor, lowering the temperature of said annulus to bring the material thereof to a predetermined optimum viscosity by passing the required amount of coolant through the hollow walls of the rotor, tangentially flinging streams of said material out of the annulus from the rim of said distributor in a substantially vertical plane, blowing a strong annular blast of a gaseous fluid upon said streams from beyond the open end of said rotor and in a direction from the open toward the closed end thereof to attenuate said streams into mineral wool fibers, and collecting the latter.

3. Process of making mineral wool from molten slag-like material which comprises pouring a stream of said material at a temperature of about 2800° F. and having a viscosity of about 3.7 poises onto the interior wall of an open-ended water-cooled cup-shaped rotor rotating about a substantially horizontal axis, cooling the slag thereby to about 2500° F., whereby its viscosity increases to about 10 poises and then centrifugally flinging streams of said slag tangentially from the rim of said rotor and blasting the same into mineral wool fibers by means of an annular blast of a gaseous fluid directed parallel with the axis of rotation of said rotor and in a direction from its open end towards its closed end, and collecting the fibers thus formed.

4. The process as claimed in claim 3 wherein the gaseous fluid is steam.

5. Apparatus for making mineral wool fibers which comprises a source of hot molten slag-like material, a hollow-walled cylindrical rotor, one end of said rotor being open to form a cup-shaped distributor, means for directing a stream of molten slag onto the inerior walls of said distributor to form an annulus of molten material therein, means for controlling the temperature of said annulus consisting of tubes through which to introduce and educt a coolant into and out of the hollow walls of said rotor, and an annular blow-nozzle directed against the open end of said rotor.

RICHARD M. DOWNEY.

REFERENCES CITED

The following references are of record in the file of this patent:

UNITED STATES PATENTS

| Number | Name | Date |
|---|---|---|
| 1,997,405 | Henry | Apr. 9, 1935 |
| 1,998,666 | Frank | Apr. 23, 1935 |
| 2,129,703 | Merle | Sept. 13, 1938 |
| 2,311,870 | Richardson et al. | Feb. 23, 1943 |
| 2,328,714 | Drill et al. | Sept. 7, 1943 |